(12) United States Patent
Wenzel

(10) Patent No.: US 11,438,022 B2
(45) Date of Patent: Sep. 6, 2022

(54) COMMUNICATION DEVICE AND METHOD FOR PROVIDING UNINTERRUPTED POWER TO A COMMUNICATION DEVICE

(71) Applicant: Rohde & Schwarz GmbH & Co. KG, Munich (DE)

(72) Inventor: Dietmar Wenzel, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 133 days.

(21) Appl. No.: 17/011,038

(22) Filed: Sep. 3, 2020

(65) Prior Publication Data

US 2021/0126664 A1  Apr. 29, 2021

(30) Foreign Application Priority Data

Oct. 25, 2019  (EP) ..................................... 19205244

(51) Int. Cl.
*H04B 1/38* (2015.01)
*H04B 1/3827* (2015.01)
*H02J 7/00* (2006.01)
*H02J 9/06* (2006.01)
*H04B 1/3883* (2015.01)

(52) U.S. Cl.
CPC .......... *H04B 1/3833* (2013.01); *H02J 7/0045* (2013.01); *H02J 9/06* (2013.01); *H04B 1/3883* (2013.01)

(58) Field of Classification Search
CPC ... H04B 1/3833; H04B 1/3883; H02J 7/0045; H02J 9/06
See application file for complete search history.

(56) References Cited

U.S. PATENT DOCUMENTS 5,732,359 A * 3/1998 Baranowsky, II . H04B 7/18563
455/437
5,844,400 A * 12/1998 Ramsier ................ H02J 7/0045
320/106

(Continued)

FOREIGN PATENT DOCUMENTS

WO  2014183734 A2  11/2014
WO  2014183734 A3  11/2014

OTHER PUBLICATIONS

Extended European Search Report for European Patent Application No. 19205244.7, dated May 8, 2020, 8 pages.

(Continued)

*Primary Examiner* — Junpeng Chen
(74) *Attorney, Agent, or Firm* — Westman, Champlin & Koehler, P.A.

(57) ABSTRACT

The present invention relates to a communication device, in particular a mobile communication device such as portable radio, which is powered by a removable battery. The power supply of the communication device may be maintained by connecting an external power supply to the communication device and powering the operating elements of the communication device by the external power supply during a replacement of the battery of the communication device. In this way, an uninterrupted power supply of the communication device is achieved. Thus, no shutdown or restart of the communication device is required for replacing the batteries.

14 Claims, 3 Drawing Sheets

(56) References Cited

U.S. PATENT DOCUMENTS

| | | | | |
|---|---|---|---|---|
| 6,021,332 | A * | 2/2000 | Alberth, Jr. | H04M 1/0254 |
| | | | | 340/636.15 |
| 6,449,499 | B1 * | 9/2002 | Ishikura | H04B 1/3877 |
| | | | | 455/571 |
| 6,993,357 | B1 * | 1/2006 | Ito | H04W 52/0274 |
| | | | | 455/343.1 |
| 2009/0236912 | A1 | 9/2009 | Datta et al. | |
| 2013/0339720 | A1 * | 12/2013 | Levy | H04W 52/027 |
| | | | | 713/100 |
| 2016/0088132 | A1 | 3/2016 | Kranz | |
| 2019/0104480 | A1 * | 4/2019 | Hasholzner | G06F 1/324 |

OTHER PUBLICATIONS

Star-Pan, "Symbiotic radio / battery power utilization and management for JTAC and other battery-power-intensive mission profiles", Glenair, Inc, www.glenair.com, dated Oct. 2017, 2 pages.

Star-Pan, "Tactical Soldier Systems: Multiport Data and Power Management Hubs", Glenair, Inc, 39 pages.

Star-Pan, "USB Hub / Power Distribution Systems", Glenair, Inc, www.glenair.com, dated Oct. 2017, 13 pages (part 1).

Star-Pan, "USB Hub / Power Distribution Systems", Glenair, Inc, www.glenair.com, dated Oct. 2017, 12 pages (part 2).

Star-Pan, "USB Hub / Power Distribution Systems", Glenair, Inc, www.glenair.com, dated Oct. 2017, 20 pages (part 3).

\* cited by examiner

US 11,438,022 B2

COMMUNICATION DEVICE AND METHOD FOR PROVIDING UNINTERRUPTED POWER TO A COMMUNICATION DEVICE

CROSS-REFERENCE TO RELATED APPLICATION(S)

This application claims priority to European Patent Application No. 19205244.7, filed Oct. 25, 2019, the content of which is hereby incorporated by reference in its entirety.

TECHNICAL FIELD

The present invention relates to a communication device for wireless communication. The present invention further relates to a method for providing uninterrupted power to a communication device, in particular a mobile communication device.

BACKGROUND

Although applicable in principle to any mobile device, the present invention and its underlying problem will be hereinafter described in connection with a mobile communication device such as a handheld radio.

Mobile communication devices, such as handheld radios require a power supply for operating a device. For this purpose, a battery, in particular a rechargeable battery may be used. However, when replacing the battery, the power supply of the communication device is interrupted. Thus, the communication device has to be shut down before replacing the battery. After replacing the battery, the communication device is restarting. Depending on the applications running on the communication device, shutdown and the restart of the communication device may take a relative long time period, and the communication device cannot be operated during this time period.

However, in some fields of application such an interruption of the communication may raise an issue. For example, in the field of rescue services or military applications, it is desirable to shorten or even avoid an interruption of the communication.

SUMMARY

Against this background, there is a need to provide an uninterrupted power supply of a mobile device such as a wireless communication device when replacing batteries.

The present invention provides a communication device and a method for providing uninterrupted power to a communication device with the features of the independent claims. Further advantageous embodiments are subject-matter of the dependent claims.

According to a first aspect, a communication device for wireless communication is provided. In particular, the communication device may be a mobile or portable communication device. The communication device comprises a transceiver, a processing unit and a power supply. The transceiver is configured to receive wireless radio signals. The transceiver may be further configured to transmit wireless radio signals. The processing unit is electrically coupled to the transceiver. The processing unit is configured to process the received radio signals. The power supply is configured to provide electrical power to the transceiver and the processing unit. In particular, the power supply comprises a removable battery, a power connector and a switch. The power connector is configured to be connected to an external power source. The switch is configured to selectively provide electrically power to the transceiver and a processing unit by either the removable battery or the external power source connected to the connector of the power supply.

According to a further aspect, a method for providing uninterrupted power to a communication device is provided. The communication device may comprise a processing unit and a transceiver for wireless communication. In particular, the communication device may be a mobile or portable communication device. The method comprises a step of providing power to the transceiver and the processing unit. The power may be provided from a removable battery, which is electrically and mechanically connected to the communication device. The method further comprises a step of connecting an external power supply to the communication device. Further, the method comprises a step of switching the power supply to the transceiver and the processing unit. In particular, the power is switched from the removable battery to the external power supply.

The present invention is based on the fact that removing a battery of a mobile device such as a portable communication device, may cause an interruption of the power supply. Thus, replacing the battery may require shutting down the device, replacing the battery and restarting the communication device after a new battery has been inserted. These operations require a time period during which the device cannot be operated. However, in some fields of application, an interruption of a communication may cause a serious issue.

In order to overcome this problem, the present invention provides a solution for replacing a battery of a mobile device, such as a portable communication device, without interrupting the power supply. Since the power supply to the elementary components of the communication device is maintained during replacing the battery, the operation of the device is not interrupted. Consequently, a communication with such a portable communication device is not interrupted during the replacement of the battery.

The communication device may be any kind of communication device, in particular a battery driven communication device. For example, the communication device may be a mobile or portable communication device, which transmits radio frequency signals and receives radio frequency signals. For example, the communication device may be a handheld radio or the like. In particular, the communication device may be a communication device, which is controlled and/or operated by a processing unit. Accordingly, the processing unit may comprise one or more processors with corresponding instructions. For example, the processor may be communicatively coupled with a memory, which stores the respective instructions. Accordingly, the processor may load and executes the instructions from the memory in order to perform the desired operations. The processor may further execute an operating system that loads and executes the instructions. The processor may be, for example, an Intel processor that runs a Windows or Linux operating system that loads and executes the instructions. However, the processor may be any other kind of processor for executing the respective instructions.

For example, the processing unit may receive digital data and convert the digital data in signals, which may be transmitted by the transceiver. The processing unit may also receive signals from the transceiver and convert the received signals to data, in particular digital data, which may be further processed and output to a user or a further device via a communication link. For example, a specific modulation/demodulation may be applied, the data may be encoded/ decoded or any other appropriate operation may be performed. For example, a specific frequency hopping scheme may be applied for further improving the reliability of a communication link.

The transceiver may be any kind of transceiver for transmitting the signals or data obtained from the processing unit, in particular for transmitting wireless radio frequency signals. The transceiver may also receive wireless radio frequency signals and provide the received signals to the processing unit for further processing. For this purpose, the transceiver may be coupled with one or more appropriate antennas for transmitting and receiving wireless signals.

For operating the transceiver and the processing unit, the transceiver and the processing unit are powered by the power supply. For example, a direct current voltage with a predetermined voltage or within a predetermined voltage range is provided to the transceiver and the processing unit. For this purpose, power may be provided by one or more batteries. Since a battery usually only provides a limited amount of power, the batteries may be removed and replaced by other batteries when the battery power becomes weak. The removed batteries may be charged by an external charging device.

In order to maintain the power supply of the communication device during the replacement of the batteries, an external power supply may be connected to the communication device. For this purpose, a power connecting interface may be provided. In particular, any appropriate connection with a plug and a connector may be used for connecting the external power supply to the communication device. For example, a voltage of the external power supply may be almost the same as the internal voltage or the voltage provided by the battery. However, it may be also possible to provide an external power supply having a different voltage, in particular a voltage within a specific predetermined range.

For controlling the power supply and assuring an uninterrupted power supply to the components of the communication device, in particular the processing unit and the transceiver, the power supply from the battery or the external power supply is controlled by a switch. Especially, the switch may provide an electrical connection between the battery and the transceiver and the processing unit during a normal operation mode. In this mode, the communication device is powered by the battery.

After connecting the external power source to the communication device, the switch may establish a connection between the external power source, in particular the connector for connecting the external power source and the processing unit and the transceiver. Accordingly, after switching over from the battery to the external power source, the communication device is powered by the external power source. Consequently, it is possible to remove the battery without interrupting the power supply to the transceiver and the processing unit.

As long as the transceiver and the processing unit are powered by the external power source, it is possible to remove the battery and to replace the battery by another battery. After connecting/inserting the new battery, the power supply can be switched back to the battery, and the external power source can be disconnected. In this way, an uninterrupted power supply to the communication device, in particular the processing unit and the transceiver is achieved during the process of replacing the battery of the communication device.

Further embodiments of the present invention are subject of the further subclaims and of the following description, referring to the drawings.

In a possible embodiment, the processing unit is configured to generate radio signals and provide the generated radio signals to the transceiver. Accordingly, the processing unit does not only obtain radio signals from the transceiver and process the received radio signals. Furthermore, it is also possible to establish a transmission. In this way, a bidirectional communication with one or more communication partners can be achieved.

In a possible embodiment, the processing unit is configured to decode the received radio signals. Furthermore, the processing unit may be configured to generate encoded data before transmitting radio signals. In this way, the privacy of the communication can be improved. Furthermore, the privacy can be also improved by applying frequency hopping or any other manner for establishing a secure communication.

In a possible embodiment, the communication device comprises a charging unit. The charging unit may be configured to charge the removable battery. In particular, the battery may be charged based on electrical power provided by the external power source. In this way, it is possible to recharge the battery without removing the battery. Since the communication device, in particular the processing unit and the transceiver may be powered by the external power source during the charging process, the reliability of the operation can be improved. In particular, a reliable and stable power supply can be provided to the transceiver and the processing unit during the charging process.

In a possible embodiment, the switch of the power supply is configured to connect the charging unit to the power connector. In this way, the current of the power supply is completely controlled by the switch.

In a possible embodiment, the switch is configured to automatically connect the transceiver and the processing unit with the power connector when a power source is connected to the power connector. In this way, the processing unit and the transceiver are supplied by the external power source upon connecting an external power source to the communication device. Hence, the power supply is stabilized and the user can replace the battery without any impact to the operation of the communication device.

In a possible embodiment, the power connector comprises a locking mechanism. The locking mechanism may be configured to lock the connector to the external power supply. In particular, the external power supply may be locked as long as the battery is removed. In this way, it can be ensured that reliable power supply is maintained during the replacement of the battery.

In a possible embodiment, the communication device comprises a coupling device. The coupling device may be configured to electrically and mechanically couple the removable battery to the power supply. In this way, the coupling device provides a simple and easy replacement of the battery. Furthermore, the coupling device may ensure that the battery is firmly connected to the communication device. Hence, an unwanted removal of the battery can be prevented.

In a possible embodiment, the power connector is configured to be connected with a power supply of a vehicle. Accordingly, the communication device may be powered by the electrical system of the vehicle during the replacement of the battery.

In a possible embodiment, the power supply comprises a power converter, in particular a DC/DC converter. The power converter may be configured to convert a voltage of the external power source to an internal supply voltage of the communication device. In this way, the voltage of the internal power supply can be easily adapted to a voltage, which is appropriate for operating the communication device. Thus, a voltage in a wide voltage range may be used for power supply during the battery replacement.

In a possible embodiment, the communication device is a handheld radio. In particular, the communication device may be a handheld radio of an emergency service or a military radio.

With the present invention it is therefore now possible to provide a stable and uninterrupted power supply to a mobile device such as a handheld communication device when replacing batteries of the device. In particular, the power supply of the device is maintained by an external power supply during a replacement process. In this way, the operation of the device can be continued even though the internal power supply by the battery is interrupted.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
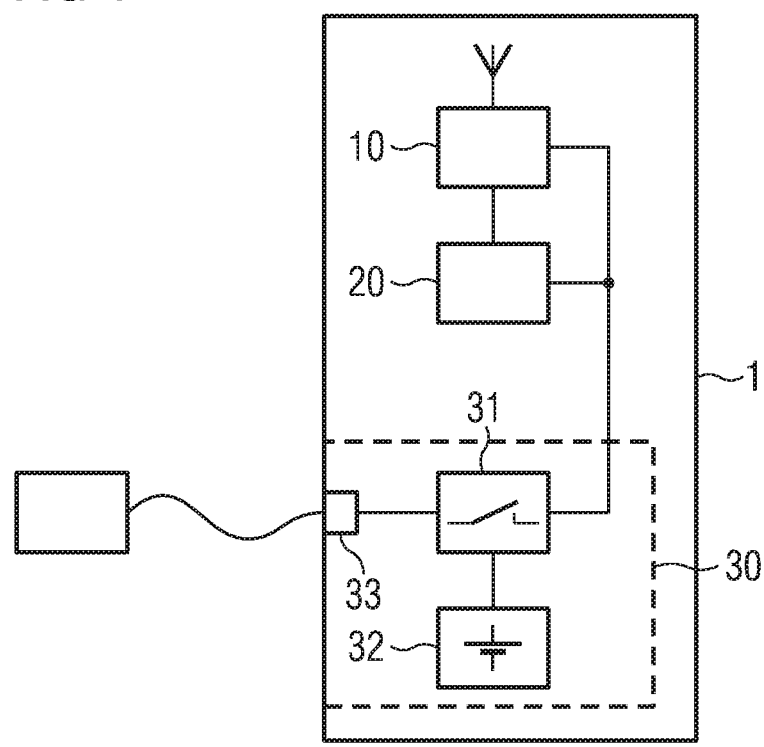
FIG. 1: shows a block diagram of an embodiment of a communication device according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In the drawings, same, functionally equivalent and identical operating elements, features and components are provided with same reference signs in each case, unless stated otherwise.

DETAILED DESCRIPTION OF THE DRAWINGS

FIG. 1 shows a block diagram of a communication device 1 according to an embodiment. The communication device 1 may be a mobile communication device, in particular a portable communication device such as a handheld radio or the like. The communication device 1 may comprise a transceiver 10 for receiving wireless signal by means of an antenna, and for transmitting wireless signals to the environment via the antenna. The transceiver 10 may be any kind of appropriate transceiver for transmitting and receiving wireless signals. For this purpose, the transceiver 10 may comprise elements like filters, oscillators, mixers, amplifiers, attenuators etc.

Transceiver 10 may be coupled to a processing unit 20. Processing unit 20 may be provided with the signals received by transceiver 10. Accordingly, processing unit 20 may process the received signals. For example, processing unit 20 may demodulate the signals, decode encrypted data included in the received signals, or apply any other processing to the received signals. Furthermore, processing unit 20 may process data or signals to be transmitted and provide the processed data or signals to transceiver 10. For example, processing unit 20 may apply an encoding for encrypting the data, perform a modulation or any other processing to the data or signals to be transmitted.

Processing unit 20 may also control the operation of transceiver 10. For example, processing unit 20 may set a frequency or transmission channel in transceiver 10 for receiving or transmitting the wireless signals. Furthermore, processing unit 20 may control, for example a frequency hopping scheme or any other feature of the transmission or reception process. For example, processing unit 20 may control the transmission power or the sensitivity of a reception. However, it is understood that a processing unit 20 may also perform any other appropriate operation in connection with transmission or reception of wireless signals.

Transceiver 10 and processing unit 20 may be provided with power by means of a power supply 30. However, it is understood that power supply 30 may also provide power to further components of communication device 1.

Since communication device 1 is a mobile communication device, in particular a portable communication device such as a handheld radio, power may be provided by a battery 32. Battery 32 may be, for example, a rechargeable battery. In particular, battery 32 may be a removable battery. Accordingly, battery 32 may be removed and replaced by another battery. In this way, battery 32 may be charged by means of an external charging station or the like.

In addition to the removable battery 32, power supply 30 further comprises a power connector 33. The power connector 33 may be any kind of connector such as a plug or socket for connecting an external power source. Power connector 33 may comprise at least two terminals. In this way, a direct current power source may be connected to power supply 30.

The external power source may be any kind of power source, which is appropriate for providing power for operating the communication device 1. In particular, the external power source may provide a voltage, which is at least almost in the range of the operating voltage of the communication device 1. For example, the voltage of the external power supply may be in a range, which is approximately the voltage of the removable battery 32. Alternatively, an AC voltage may be provided by the external power source and the AC voltage may be rectified by a rectifier included in the communication device 1, in particular a rectifier of power supply 30.

Power supply 30 may further comprise a switch 31. Switch 31 may selectively switch the power supply of the communication device, in particular the power supply of transceiver 10 and processing unit 20 either to the removable battery 32 or the power connector 33. Switch 31 may be a mechanical or an electrical switch. For example, switch 31 may comprise one or more semiconductor switches for switching the power supply between the battery 32 and the external power source connected to power connector 33. Alternatively, switch 31 may comprise one or more relay for mechanically switching between the removable battery 32 and the external power source.

For example, switch 31 may be in a first state for powering processing unit 20 and transceiver 10 by battery 32, if a first signal is applied to switch 31. Switch 31 may be in a second state for connecting power connector 32 with the transceiver 10 and the processor 20, if a second signal is provided to switch 31. For example, the first signal may be a low signal, e.g. 0 Volt, and the second signal may be high signal with a voltage different from 0 Volt. However, it is understood that any other manner for controlling the switch 31 may be also possible.

By the above described configuration it is possible to operate the communication device 1 with a power supply provided by removable battery 32. If the removable battery 32 becomes weak, the communication device 1 may be connected to an external power source via power connector 33. After switch 31 has switched over the power supply from the removable battery 32 to the external power source connected to power connector 32, the removable battery 32 can be removed and replaced by another battery. In this way, the operation of communication device 1 can be continued during the replacement process of the removable battery 32. Thus, an uninterrupted power supply of the communication device 1, in particular transceiver 10 and the processing unit 20 is provided during the replacement of the removable battery 32. Hence, there is no need to shut down the communication device 1 before replacing the removable battery 32, and to start and reboot the communication device 1 after the removable battery 32 has been replaced.

Figure 2:
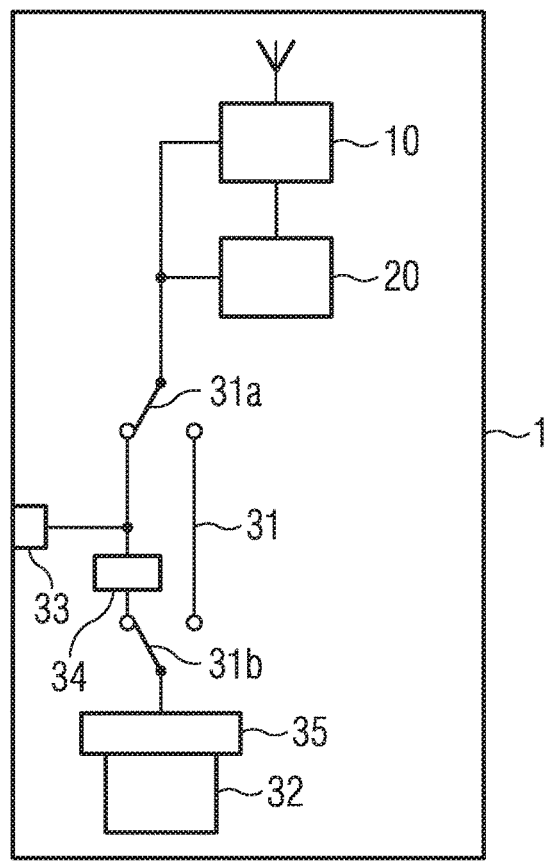
FIG. 2: shows a block diagram of another embodiment of a communication device according to an embodiment.

FIG. 2 shows a block diagram of another embodiment of a communication device 1. It is understood that all features of the individual embodiments may be combined, if possible. Thus, all explanations in conjunction with FIG. 1 also apply to the embodiment according to FIG. 2 and the following embodiments.

As can be seen in FIG. 2 in more detail, switch 31 may comprise a first switch 31a. The first switch 31a may connect the power supply for processing unit 20 and transceiver 10 either to the removable battery 32 or the external power source connected to power connector 32. Further, switch 31 may comprise a second switch 31b for connecting the removable battery 32 either to the power supply for processing unit 20 and transceiver 10 or to the external power source connected to power connector 32. In this way, the removable battery 32 may be charged by the external power source. For charging the removable battery 32, the power of the external power source may be provided to a charging unit 34. Accordingly, charging unit 34 may control the charging operation of the removable battery 32. For example, the charging voltage and/or the charging current for charging the removable battery 32 may be controlled by charging unit 34.

The removable battery 32 may comprise a number of one or more battery elements. The removable battery 32 may be inserted into an appropriate receiving element for receiving the removable battery 32. For this purpose, any appropriate receiving element may be used.

Furthermore, it may be possible that the communication device 1, in particular the power supply 30 of the communication device 1 may provide an appropriate coupling device 35 for mechanically and electrically coupling the removable battery 32 with the communication device 1, in particular the power supply 30 of the communication device 1. For this purpose, coupling device 35 may provide holding elements, for example grooves or rails for mechanically coupling the removable battery 32 with the communication device 1. Furthermore, the coupling device 35 may comprise connectors for electrically coupling the removable battery 32 with the power supply 30 of the communication device 1. It is understood, that any appropriate manner for electrically and mechanically coupling battery 32 with the communication device 1 may be possible, too.

Figure 3:
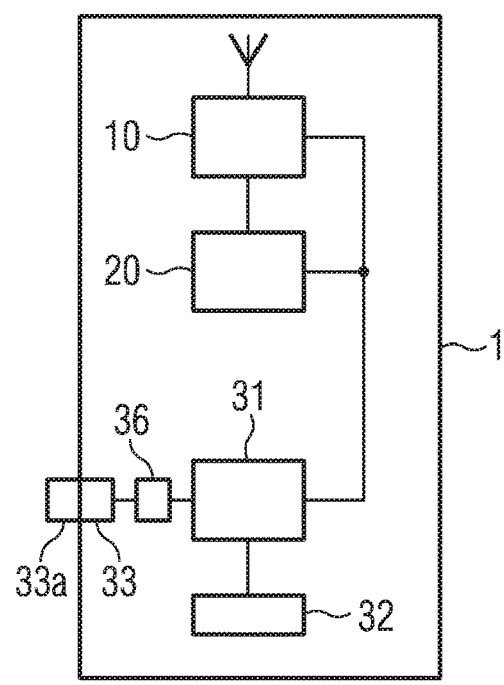
FIG. 3: shows a further embodiment of a communication device according to an embodiment.

FIG. 3 shows a schematic block diagram of a further embodiment of a communication device 1. As can be seen in this further embodiment, power supply 30 of the communication device 1 may comprise a power converter 36, in particular a DC/DC power converter. In particular, power converter 36 may convert the voltage of the external power supply to an appropriate voltage for supplying the components of the communication device 1, in particular transceiver 10 and the processing unit 20. For example, power converter 36 may comprise a transformer for galvanic isolating the internal power supply of communication device 1 and the external power source.

Furthermore, power connector 33 may comprise a locking device 33a. Locking device 33a may be configured to lock a connector, for example a plug of the external power source when connecting the connector of the external power source with the power connector 33. In particular, locking device 33a may provide a mechanically locking of the power connection to the external power source. In this way, can be ensured that the connection to the external power source is maintained while replacing the removable battery 32.

The external power source may be any kind of appropriate power source. For example, the power source may be a connection to an electrical network of vehicle. However, any other kind of external power source may be possible, too.

The communication device 1 may be, for example, a communication device of an emergency service. Especially, communication devices for emergency services shall provide a continuous communication without interruption. By maintaining the power supply of the communication device during the replacement of the battery 32, such a continuous communication can be provided.

Furthermore, communication device 1 may be a communication device for military applications, for example a military radio. However, it is understood, that any other kind of communication device, in particular mobile communication device such as portable radios or the like may be possible.

Figure 4:
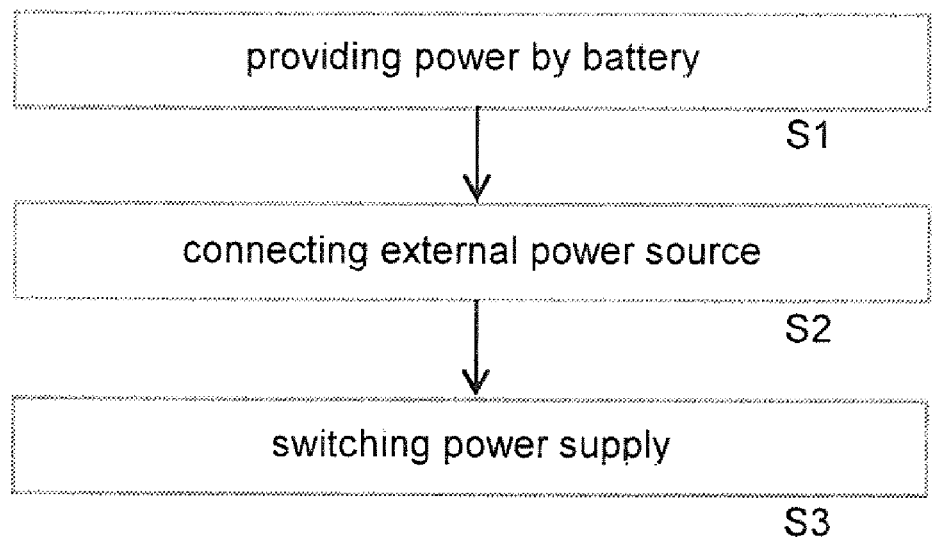
FIG. 4: shows a flow diagram of an embodiment of a method for providing uninterrupted power.

FIG. 4 shows a flow diagram of a method for providing uninterrupted power to a communication device according to an embodiment. The method may comprise any kind of step for operating a communication device as described above in connection with FIGS. 1 to 3. Furthermore, the above described communication device may be configured to perform an operation as described in the following.

In a first step S1, power is provided to a transceiver 10 and a processing unit 20 of the communication device 1. In particular, the power is provided from a removable battery 32. The removable battery 32 may be connected electrically and mechanically to the communication device 1.

In a second step S2, an external power supply is connected to the communication device 1, in particular to a power connector 33 of the communication device 1. In a third step S3, the power supply of the communication device, in particular the transceiver 10 and the processing unit 20 is switched from the removable battery 32 to the external power supply connected to the power connector 33.

The method may further comprise a step of charging the removable battery in the communication device 1 by electrical power provided by the external power supply.

The method may further comprise locking a connection of the external power supply to the communication device by a locking device 33a when the removable battery is removed.

Further, the method may comprise releasing the locked connection to the external power supply when the removable battery has been connected to the communication device 1.

Summarizing, the present invention relates to a communication device, in particular a mobile communication device such as portable radio, which is powered by a removable battery. The power supply of the communication device may be maintained by connecting an external power supply to the communication device and powering the operating elements of the communication device by the external power supply during a replacement of the battery of the communication device. In this way, an uninterrupted power supply of the communication device is achieved. Thus, no shutdown or restart of the communication device is required for replacing the batteries.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

I claim:

1. A handheld radio communication device for wireless communication for an emergency service or a military use, the communication device comprising:
    a transceiver configured to receive wireless radio signals and to transmit wireless radio signals,
    a processing unit electrically coupled to the transceiver and configured to process the received radio signals, and
    a power supply configured to provide electrical power to the transceiver and the processing unit, wherein the power supply comprises a removable battery, a power connector and a switch, and wherein the power connector is configured to be connected to an external power source, and the switch is configured to selectively provide electrical power to the transceiver and the processing unit either by the removable battery or by the external power source connected to the power connecter, wherein the power connector comprises a locking mechanism configured to lock a connector of the external power supply when the removable battery is removed.

2. The handheld radio communication device of claim 1, wherein the processing unit is configured to generate radio signals and to provide the generated radio signals to the transceiver.

3. The handheld radio communication device of claim 1, wherein the processing unit is configured to decode the received radio signals.

4. The handheld radio communication device of claim 1, wherein the processing unit is configured to generate encoded radio signals.

5. The handheld radio communication device of claim 1, further comprising a charging unit configured to charge the removable battery based on electrical power provided by the external power source connected to the power connector.

6. The handheld radio communication device of claim 5, wherein the switch is further configured to connect the charging unit to the power connector.

7. The handheld radio communication device of claim 1, wherein the switch is configured to automatically connect the transceiver and the processing unit with the power connector when the external power source is connected to the power connector.

8. The handheld radio communication device of claim 1, further comprising a coupling device configured to electrically and mechanically couple the removable battery to the power supply.

9. The handheld radio communication device of claim 1, wherein the power connector is configured to be connected with a power supply of a vehicle.

10. The handheld radio communication device of claim 1, wherein the power supply comprises a power converter configured to convert a voltage of the external power source to an internal supply voltage of the communication device.

11. The handheld radio communication device of claim 1, wherein the communication device is a handheld radio.

12. A method for providing uninterrupted power to a handheld radio communication device for an emergency service or a military use, the handheld radio communication device comprising a processing unit and a transceiver for wireless communication, the method comprising:
    providing power to the transceiver and the processing unit, wherein the power is provided from a removable battery which is electrically and mechanically connected to the communication device;
    connecting an external power supply to the communication device;
    switching the power supply of the transceiver and the processing unit from the removable battery to the external power supply; and
    locking, by a locking mechanism, a connection of the ex-ternal power supply to the communication device when the removable battery is removed.

13. The method of claim 12, further comprising charging the removable battery by electrical power of the external power supply.

14. The method of claim 12, further comprising releasing the locked connection of the external power supply when the removable battery is connected to the communication device.

* * * * *